May 28, 1935.  K. L. SCOTT  2,002,680
APPARATUS FOR MEASURING ELECTRICAL QUANTITIES
Filed March 8, 1932
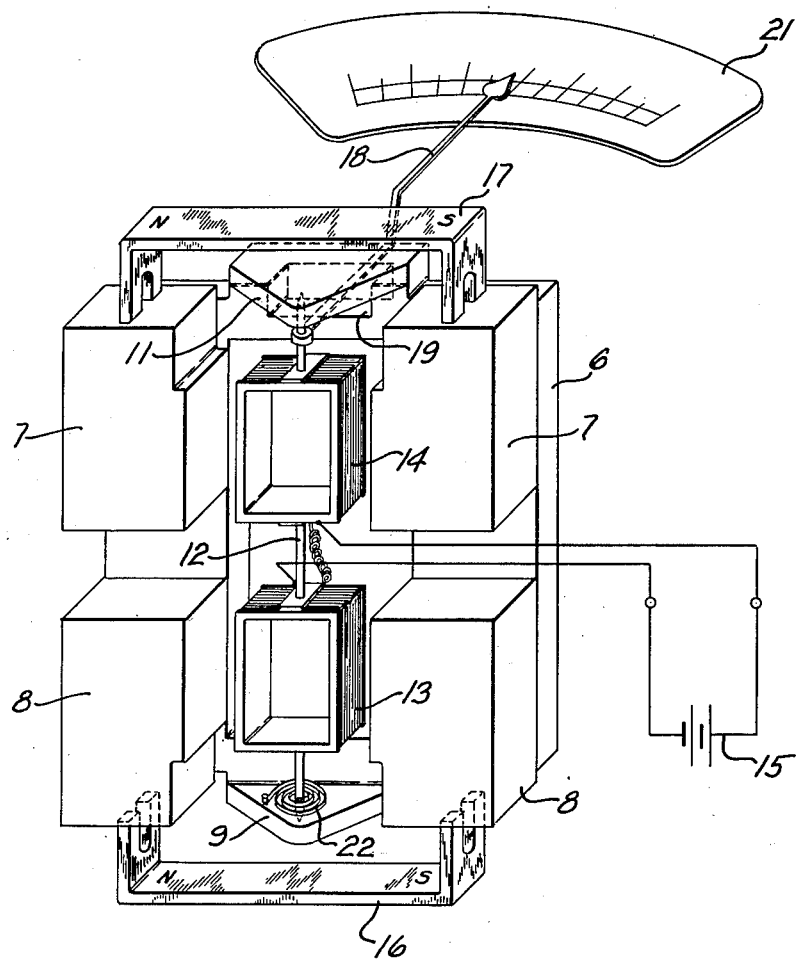
Inventor
K. L. Scott
By H. Q. Whitehorn Att'y.

Patented May 28, 1935

2,002,680

UNITED STATES PATENT OFFICE 2,002,680

APPARATUS FOR MEASURING ELECTRICAL QUANTITIES

Kenneth L. Scott, Western Springs, Ill., assignor to Western Electric Company, Incorporated, New York, N. Y., a corporation of New York Application March 8, 1932, Serial No. 597,497

9 Claims. (Cl. 175—183)

This invention relates to an apparatus for measuring electrical quantities and more particularly to an apparatus for measuring the magnetic flux of a magnet.

Objects of the invention are to provide an accurate and convenient apparatus for measuring electrical quantities.

In accordance with one embodiment of the invention, a pair of mechanically interconnected coils are provided having equal numbers of turns and equal areas, one of the coils being disposed in the field of a standard magnet and the other in the field of a magnet to be tested, whereby the differential torque between the coils will give a measure of the relative magnetic strength of the magnets.

A complete understanding of the invention may be had by reference to the following description taken in conjunction with the accompanying drawing, in which the single figure is a schematic perspective view of an apparatus embodying the invention.

The apparatus may be mounted upon a nonmagnetic rectangular plate 6 to which a plurality of pole pieces 7—7 and 8—8 are secured. The plate 6 is provided with a pair of forwardly extending bearing plates 9 and 11 in which a shaft 12 is journaled. The shaft 12 rotatably supports two coils 13 and 14 which have an equal number of turns and equal areas. These coils are connected in series and are energized by any suitable source of electromotive force 15. On account of the fact that the coils are connected in series, they will have equal currents flowing therethrough, irrespective of the voltage of source 15, which may vary without disturbing the equality of the currents. Thus, since the coils have equal currents flowing therethrough and since the areas and numbers of turns in the coils are equal, equal magnetic fluxes will be set up by the coils.

The faces of the pole pieces 7—7 and 8—8 preferably project towards the coils and into close proximity to the coils, leaving sufficient clearance, however, for the coils to rotate. This construction of the pole pieces insures that the lines of fluxes passing between the pairs of pole pieces will pass through the coils in substantially parallel lines. It is evident that the pole pieces 7—7 and 8—8 may be made of any suitable magnetic material, such as soft iron or other magnetic material. In the preferred form of the invention, however, the pole pieces are made of a highly permeable nickel-iron alloy, such as permalloy.

The poles 8—8 are adapted to be bridged by a standard magnet of known strength for producing flux of known value. The pole pieces 7—7 are adapted to have a magnet 17 to be tested associated therewith to determine its strength relative to the strength of the standard magnet 16. Since the magnetic fluxes produced by the coils are equal, as pointed out above, it is evident that the torques exerted upon the coils by the fluxes of the magnets will be proportional to the strength of the magnets. While the coils are connected in series, they are also wound in such directions that the torque exerted upon one of the coils will be in the opposite direction from the torque exerted upon the other of the coils with a given arrangement of the polarity of the magnets.

In order to provide an indication of the relative strength of the fluxes, a pointer 18 is attached to the upper end of shaft 12 and extends through a rectangular opening 19 in base 6. This pointer cooperates with a dial 21 to give an indication of the strengths of the magnets. A spiral spring 22 is secured to shaft 12 to normally return the pointer to zero. When the magnet 17 to be tested is exactly equal in strength to the strength of the magnet 16, the pointer will remain in zero position in the center of the dial, because the torques exerted on the coils will be equal and opposite. However, if one of the magnets is stronger than the other, the pointer will move either to the right or to the left of the zero point, the direction depending upon whether the specimen being tested is stronger or weaker than the standard magnet 16. The dial may be calibrated to indicate the amount that the magnet being tested is stronger or weaker than the standard magnet, although if it is desired to merely indicate whether the magnet being tested is stronger or weaker than the standard magnet without reference to the amount of this difference, the spring 22 may be omitted, in which case the direction of movement or stationary condition of the pointer are the sole indicating factors.

It will be evident that when the spring 22 is omitted, the sensitivity of the device is dependent only upon the friction in the bearings and upon the amount of current flowing through the coils. By making the current through the coils sufficiently high, the friction of the bearings of the device may be made negligible.

The apparatus has been found to readily lend itself to an accurate and rapid determination of the strength of permanent magnets.

The embodiment of the invention herein described and illustrated is merely a convenient and useful form of the invention and it is evident that various changes and modifications may be made therein, without departing from the spirit and scope of the invention.

What is claimed is:

1. In an electrical measuring device, a pair of coils, a common shaft for the coils, means for subjecting one of said coils to a magnetic flux of known value, means for subjecting the other coil to a flux to be determined, and means responsive to the differential torque on said shaft for indicating the relative values of said fluxes.

2. In an electrical measuring device, means for establishing a magnetic flux of known value, means for establishing a flux whose value is to be determined, a pair of mechanically interconnected electro-magnetic devices, each in a field of one of said fluxes, and an indicating device actuated by the differential torque exerted by said electro-magnetic devices.

3. In an electrical measuring device, a pair of pole pieces adapted to be associated with a standard magnet, a second pair of pole pieces adapted to be associated with a magnet to be tested, a coil between each of said pair of pole pieces, means for serially energizing said coils, a common shaft for said coils, and an indicating device actuated by said shaft.

4. In an electrical measuring device, a pair of pole pieces, a standard magnet having its ends abutting the pole pieces, a second pair of pole pieces adapted to be interconnected by a magnet to be tested, a pair of coils, one of which is disposed between each of said pairs of pole pieces, means for serially energizing said coils, a common shaft for said coils, and an indicating device actuated by said shaft.

5. In an electrical measuring device, a pair of coils, means for producing equal fluxes in said coils, means for producing a standard flux to act upon the flux of one of said coils, means for causing the flux of a magnet to be tested to act upon the flux of the other of said coils, and means responsive to the differential action of said fluxes for determining the flux of the magnet to be tested.

6. In an electrical measuring device, a pair of coils, means for mechanically interconnecting said coils, a source of energy serially connected to said coils to produce a predetermined ratio of magnetic fluxes therein, means for providing a predetermined flux to coact with the flux of one of said coils, and means for providing a flux to be measured to coact with the other of said coils.

7. In an electrical measuring device, a pair of coils, means for mechanically interconnecting said coils, a source of energy serially connected to said coils to produce a predetermined ratio of magnetic fluxes therein, means for providing a predetermined flux to coact with the flux of one of said coils, means for providing a flux to be measured to coact with the other of said coils, and means for indicating the relation of said fluxes.

8. In an electrical measuring device, a pair of movable elements mounted on a common shaft, means for producing a magnetic flux of known value for urging one of said elements in one direction of rotation, means for producing a magnetic flux whose value is to be determined for urging the other element in the opposite direction of rotation, and an indicating means for indicating the relation of said fluxes.

9. An electrical measuring device comprising a pair of pole pieces, a standard permanent magnet associated therewith, a movable element including a coil between said pole pieces, a source of electric current for energizing said coil, and means for affecting said movable element differentially with a permanent magnet to be tested relative to said standard magnet.

KENNETH L. SCOTT.